United States Patent Office 3,496,172
Patented Feb. 17, 1970

3,496,172
PROCESS FOR THE PREPARATION OF α-LOWER ACYLAMINO - α - METHYL - β - (SUBSTITUTED PHENYL) PROPIONITRILES
David F. Hinkley, Plainfield, N.J., assignor to Merck & Co., Inc., Rahway, N.J., a corporation of New Jersey
No Drawing. Continuation-in-part of application Ser. No. 502,341, Oct. 22, 1965. This application Sept. 16, 1968, Ser. No. 762,362
Int. Cl. C07c *121/66, 121/50*
U.S. Cl. 260—465
9 Claims

ABSTRACT OF THE DISCLOSURE

A process is disclosed for the preparation of α-lower acylamino-α-methyl-β-(substituted phenyl)propionitriles which comprises condensing a substituted benzene with formaldehyde and a di(lower alkyl)amine to form a substituted-benzyl dialkylamine followed by reaction with an α-lower acylaminopropionitrile. The products have utility as important intermediates in the synthesis of α-methyl-β-phenyl alanines useful as antihypertensives.

The present application is a continuation-in-part of U.S. patent application Ser. No. 502,341 filed Oct. 22, 1965 now abandoned.

This invention relates to a process for the preparation of hydroxylated phenylalanines.

More particularly, it relates to a process for the preparation of intermediates in the preparation of such alanine compounds.

Still more particularly, this invention relates to the preparation of intermediates in a process for the production of α-methyldihydroxyphenylalanine.

It further particularly relates to a process for the alkylation of phenols and phenolic ethers to produce the correspondingly substituted N,N-dialkyl (hydroxy and/or alkoxy substituted)benzylamines followed by conversion of said benzylamines to correspondingly substituted α-acylamino-α-methyl-β-(hydroxy or alkoxy-substituted phenyl)propionitriles.

The compounds produced in accordance with the process of my invention are important intermediates in known processes for the preparation of the biologically active substances α-methyl-3,4-dihydroxyphenylalanine and α-methyl-p-tyrosine. The intermediate compounds produced by my process are racemic mixtures of α-acylamino-α-methyl-β-(4-hydroxy or 3,4 - dihydroxyphenyl)propionitrile or the corresponding phenolic ethers. These compounds are readily converted by known methods to the biologically active amino acids enumerated above.

Thus, for example, the compound DL-α-acetamido-α-vanillylpropionitrile is converted to α-methyl-β-(3,4-dihydroxyphenyl)alanine in the following steps. A saturated solution of the DL-propionitrile compound in isopropanol is first prepared. To the saturated solution is added a small amount of crystalline L-α-actamido-α-vanillylpropionitrile and the mixture cooled and agitated to effect crystallization of the pure L-isomer. This L-α-acetamido-α-vanillylpropionitrile is then hydrolyzed to L-α-amino-α-vanillylpropionamide by treatment with fortified hydrochloric acid at low temperatures, about −15° C., for approximately 18 hours. The amide forms in essentially quantitative yield and is readily isolated from the reaction mixture by filtration. The purified L-α-amino-α-vanillylpropionamide hydrochloride is then refluxed with 48% aqueous hydrobromic acid for about 16 hours to produce L-α-methyl-β-(3,4-dihydroxyphenyl)-alanine which is readily recovered by filtration. The corresponding L-α-methyl-p-tyrosine can be prepared from the α - acetamido-α-methyl-β-(4-hydroxyphenyl)propionamide in essentially the same manner.

In accordance with the first step of the process of my invention a phenol, an o-diphenol or a loweralkyl ether thereof, is contacted under basic conditions with formaldehyde and then a dialkylamine under acidic conditions to form an N,N-dialkyl-(4-substituted or 3,4-disubstituted)benzylamine. In the second step of the process the resulting benzylamine compound is then contacted with an α-acylaminopropionitrile to form a racemic mixture of the D and L isomers of α-methyl-α-acylamino-β-(4-substituted or 3,4-disubstituted-phenyl)propionitrile.

In accordance with a further embodiment of my invention, the α-acylaminopropionitrile used as one of the reactants in the second step of my process is prepared by heating lactonitrile, i.e., α-hydroxypropionitrile, under pressure in liquid ammonia to produce the corresponding α-aminopropionitrile which is then acylated by treatment of the aminonitrile with an excess of a loweralkanoic acid anhydride.

One of the advantages of the process of my invention may be illustrated by the improved method for the production of α-acetylamino-α-methyl-β-(3-methoxy-4-hydroxyphenyl)propionitrile, an important intermediate in the preparation of α-methyl-3,4-dihydroxyphenylalanine. Prior art methods for the preparation of this valuable intermediate ordinarily utilized a process starting with vanillin, comprising four steps. These steps included an initial condensation with nitroethane to produce a nitrostyrene-type intermediate which was reduced to methyl-3-methoxy-4-hydroxybenzyl ketone which was then, in turn, treated with an alkali metal cyanide and ammonium carbonate to produce α-amino-α-(3-methoxy-4-hydroxybenzyl)propionitrile which was acetylated to produce the α - acetylamino-α-(3-methoxy-4-hydroxybenzyl)propionitrile intermediate. The present process, on the other hand, starts with the readily available guaiacol, i.e., the monomethyl ether of o-dihydroxybenzene, and in two steps converts the guaiacol compound to the desired intermediate utilizing readily available starting materials and reagents.

The starting materials utilized in the process of my invention are phenol, catechol, or a loweralkyl ether, e.g., guaiacol. Thus, among the starting materials which may be utilized in the process of my invention are included phenol and its methyl, ethyl and propyl ether derivatives, catechol and derivatives thereof including the monomethyl, the monoethyl, the monopropyl, the dimethyl, the diethyl and the dipropyl ethers thereof, as well as the corresponding o-methylenedioxybenzene.

In accordance with the process of my invention as outlined in the following flow sheet

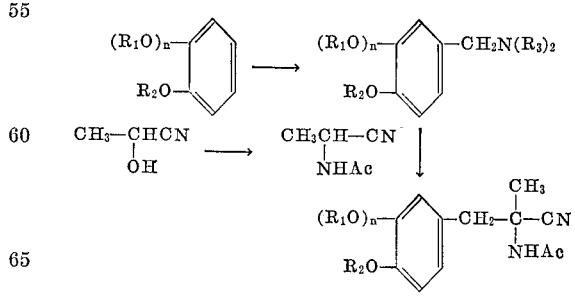

wherein $R_1$ and $R_2$=alkyl, hydrogen or methylene
$R_3$=lower alkyl
$n$=1 or 0
Ac=lower alkanoyl the starting phenol or ether thereof is intimately contacted, preferably in solution, with formaldehyde and then a dialkylamine to alkylate the benzene ring and produce the corresponding compound having a dialkylaminomethyl substituent attached in the p-position relative to one of the hydroxy or alkoxy substitutents of the benzene ring.

When aqueous formaldehyde is used as the source of the formaldehyde in the reaction mixture for the alkylation of the phenol or phenol ether, the reaction is ordinarily carried out in aqueous solution in the presence of a strong aqueous base. If the formaldehyde source utilized, on the other hand, is para-formaldehyde, an organic solvent is required to solubilize the reacting materials. Solvents other than water which may be employed for reactions employing para-formaldehyde as the source of formaldehyde include alcohols such as ethanol, propanol, butanol, isoamylalcohol, as well as other aliphatic solvents which contain no carbonyl substituent, which are solvents for the reactants and otherwise are inert under the reaction conditions. After the reaction with formaldehyde, the mixture is acidified preferably with a strong mineral acid, and the dialkylamine is added. Both reactions are readily accomplished by merely mixing the materials at room temperature for a period of about a few hours or, preferably, may be accelerated by heating to about 50° for one hour.

Following the first step, the product N,N-dialkyl(4-substituted or 3,4-disubstituted)benzylamine is extracted with an aromatic hydrocarbon, for example toluene, xylene, benzene, and the like, which extract of product can be utilized directly in the next step of my process.

In accordance with the second step of the process of my invention, the N,N-dialkylbenzylamine compound is contacted in an inert solvent with approximately an equimolar amount of an $a$-acylaminopropionitrile to produce the correspondingly substituted $\alpha$-methyl-$\alpha$-acylamino-$\beta$-(substituted phenyl)propionitrile. This condensation reaction is preferably carried out under anhydrous conditions and in the presence of a catalytic amount of a base. Alternatively, the condensation of the phenolate salt is effected in the absence of added base. Suitable bases for the catalysis of the condensation reaction include various enolyzing agents as alkali metal hydrides, e.g., sodium hydride, alkali metal alkoxides such as sodium methoxide, sodium ethoxide, and the like. The reacting species are brought together in an inert solvent. Suitable solvents are automatic hydrocarbons such as benzene, toluene and xylene or halogenated hydrocarbons such as chlorobenzene.

The reaction is readily accomplished by heating the reaction mixture to from about 50 to 150° C. and preferably to about 100° C. for a period of about 1-8 hours. During the course of the reaction, dimethylamine is evolved as the condensation takes place, is carried off as a gas and trapped for recycling in the first step of the reaction process. The product is readily recovered by evaporation of the entire reaction mixture under reduced pressure, following washing with dilute hydrochloric acid in water, and cooling to effect crystallization of the product. The products thus obtained in accordance with the process of my invention include $\alpha$-methyl-$\alpha$-acetylamino-$\beta$-(3,4-dihydroxyphenyl)propionitrile, $\alpha$-methyl-$\alpha$-acetylamino - $\beta$-(3,4-dimethoxyphenyl) propionitrile, $\alpha$-methyl-$\alpha$-acetylamino - $\beta$ - (3,4-methylenedioxyphenyl)propionitrile, $\alpha$-methyl-$\alpha$-acetylamino-$\beta$-(4 - hydroxyphenyl)propionitrile, $\alpha$-methyl-$\alpha$-acetylamino - $\beta$-(4-methoxyphenyl) propionitrile, $\alpha$-methyl-$\alpha$-acetylamino-$\beta$-(4-ethoxyphenyl) propionitrile, $\alpha$-methyl-$\alpha$-acetylamino-($\beta$-4-propoxyphenyl)propionitrile, and the corresponding $\alpha$-propionylamino and $\alpha$-butyrylamino compounds.

In accordance with a further embodiment of my invention, the reacting material employed in the second step of the reaction, i.e., the $\alpha$-acylaminopropionitrile, is prepared by the reaction of $\alpha$-hydroxypropionitrile with liquid ammonia under pressure to produce the corresponding $\alpha$-aminopropionitrile. The reaction proceeds readily and it is conveniently conducted by preparing a mixture of the $\alpha$-hydroxypropionitrile with liquid ammonia and a lower aliphatic alcohol such as ethanol, propanol, isopropanol, and the like. The reaction mixture is heated in a sealed autoclave for appproximately 30 minutes at a temperature of from 25–100° C. Following the reaction, the solvents are removed by evaporation under reduced pressure and the residual aminonitrile dissolved in water and contacted at room temperature with an excess of a lower-alkanoic acid anhydride such as acetic anhydride, propionic anhydride and butyric anhydride. The resulting $\alpha$-acylaminonitriles including $\alpha$ - acetamidopropionitrile, $\alpha$ - propionamidopropionitrile and $\alpha$-butyryamidopropionitrile are recovered by crystallization and filtration and are suitable for use in the reaction mixture in the process of my invention without further purification.

EXAMPLE 1

N,N-dimethyl-3-methoxy-4-hydroxybenzylamine

An aqueous solution of guaiacol is prepared by mixing 124 g. (1.0 mole guaiacol) in a solution of 50.0 g. (1.2 moles) of sodium hydroxide and 500 cc. of water. To this aqueous solution is added 75 g. of 40% formalin equivalent to 30 g. (1.0 mole) of formaldehyde at 25° C. with vigorous stirring. The resulting solution is heated to about 50° for one hour and then acidified to pH 1.0 by the addition of 142 ml. of concentrated hydrochloric acid equivalent to 45.6 g. hydrogen chloride (1.25 moles). To the acidified solution is then added 113 g. of 40% aqueous dimethylamine solution equivalent to 45.0 g. (1.0 mole) dimethylamine. The resulting solution is then heated to 50° C. with stirring for approximately one hour and allowed to cool, to form the product. The solution containing the product is then extracted with two 500 ml. portions of toluene. The toluene extracts of N,N-dimethyl-3-methoxy-4-hydroxybenzylamine are combined and may be employed without further treatment in the step involving condensation with $\alpha$-acetylaminopropinonitrile. Alternatively, the product may be recovered by concentration from the toluene solution to give crystalline product, M.P. 108–9° C.

When the above procedure is repeated, using as the secondary amine reactant an equivalent molar amount of diethylamine or di-N-propylamine in place of the dimethylamine used in the above reaction, the corresponding N,N-diethyl or N,N-dipropyl-3-methoxy-4-hydroxybenzylamine is obtained as the product.

The above procedures are again repeated utilizing in place of the guaiacol component an equivalent molar amount of o-dihydroxybenzene, o-dimethoxybenzene, o-di-ethoxybenzene, o-dipropoxybenzene or o-methylenedioxybenzene. The products obtained, respectively, by this method on extraction with toluene and removal of the toluene by evaporation in vacuo are N,N-dimethyl-3,4-dihydroxybenzylamine, N,N-dimethyl - 3,4 - dimethoxybenzylamine, N,N-dimethyl - 3,4 - diethoxybenzylamine, N,N-dimethyl - 3,4- methylenedioxybenzylamine and the corresponding N,N-diethyl and N,N-dipropyl benzylamines.

EXAMPLE 2

$\alpha$-Acetylamino - $\alpha$ - methyl - $\beta$ - (3 - methoxy - 4 - hydroxyphenyl)propionitrile A toluene solution of 3 - methoxy - 4 - hydroxy-N,N-dimethylbenzylamine prepared in accordance with the preceding example, having approximately 145 g. of the benzylamine substance dissolved, is mixed with 89.6 g. (0.8 mole) of solid $\alpha$-acetaminopropionitrile and 1.45 g. of sodium hydride. The resulting suspension of material is heated to the reflux temperature for approximately 4 hours, during which time dimethylamine is evolved as a gas which is recovered by passing into concentrated hydrochloric acid. Concurrently with the evolution of dimethylamine, the product, α-acetylamino - α - methyl-β-(3-methoxy - 4 - hydroxyphenyl)propionitrile is formed in equivalent amount. The product is recovered by cooling the entire reaction mixture, washing successively with dilute hydrochloric acid and water to remove any residual unwanted amine, concentrated in vacuo to a volume of about 900 ml., and cooled to 0–5° C., whereupon solid product crystallizes from solution. The crystalline product is filtered, washed with benzene, and dried, M.P. 174–6° C.

The procedure of this example is repeated, using in place of the N,N-dimethyl - 3 - methoxy - 4 - hydroxybenzylamine equivalent molar amounts of the products obtained in accordance with paragraphs 2 and 3 of the preceding example. The products obtained are the corresponding β-(dimethoxy-diethoxy or methylenedioxyphenyl) derivatives of α-acetylamino - α - methylpropionitrile.

EXAMPLE 3

α-Acetamidopropionitrile

A mixture of 142.2 g. (2.0 moles) of lactonitrile (α-hydroxypropionitrile), 130 g. (7.65 moles) of liquid ammonia, and 350 ml. of ethanol is heated at 45° C. for about 30 minutes in a sealed autoclave. The reaction mixture is then cooled to about 25° C., vented to the atmosphere and concentrated under reduced pressure to a residual oil comprising the product. The crude α-acetamidopropionitrile product is dissolved in 600 ml. of water to which is added 306 g. (3.0 moles) of acetic anhydride, cooling the solution to maintain the temperature of the reaction mixture at about 60° C. The temperature of the solution is maintained at about 60° C. for 30 minutes and then the entire reaction mixture containing the product is concentrated under reduced pressure to about 300 ml. The concentrate is cooled to about 0–5° for about one hour and the resulting crystalline product recovered by filtration, washed with water, and dried, M.P. 100–2° C.

In similar manner, when an equivalent molar amount of propionic acid anhydride or butyric acid anhydride is substituted in place of the acetic anhydride in the above-described procedure, the corresponding α-propionamidopropionitrile and α-butyrylamidopropionitrile are obtained, respectively.

What is claimed is:
1. The process which comprises reacting a compound of the formula:

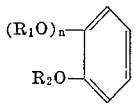

wherein $R_1$ and $R_2$ are each members selected from the group consisting of hydrogen and lower alkyl of from 1 to 4 carbon atoms when taken separately, and methylene when taken together as a single substituent, and $n$ is 0 or 1, with formaldehyde in the presence of a base in an inert solvent and then with a diloweralkylamine in the presence of a mineral acid in an inert solvent to produce a compound of the formula:

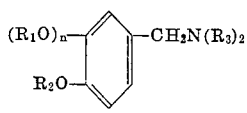

wherein $R_1$, $R_2$ and $n$ are as defined above and $R_3$ is a lower alkyl substituent of from 1 to 4 carbon atoms, and reacting said substituted benzylamine compound with an α-loweracylamino-propionitrile in the presence of a basic enolyzing catalyst in an inert solvent at from 50 to 150° C. to form racemic α-methyl - α - loweracylamino-β- (substituted phenyl) propionitrile having the formula:

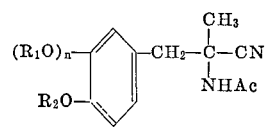

wherein $R_1$, $R_2$ and $n$ are defined above and Ac is a lower alkanoyl radical of from 2 to 4 carbon atoms.

2. The process which comprises reacting a compound having the formula:

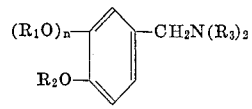

wherein $R_1$ and $R_2$ are each members selected from the group consisting of hydrogen and lower alkyl of from 1 to 4 carbon atoms when taken separately and methylene when taken together as a single substituent, $n$ is 0 or 1 and $R_3$ is a lower alkyl substituent of from 1 to 4 carbon atoms with an α-alkanoylaminopropionitrile in the presence of a basic enolyzing catalyst in an inert solvent at from 50–150° C., to form a racemic compound having the formula:

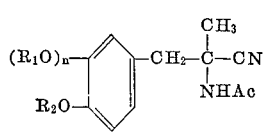

wherein $R_1$, $R_2$ and $n$ are as defined above and Ac is a lower alknoyl radical of from 2 to 4 *carbon atoms.*

3. The process according to claim 2 wherein the α-loweralkanoylaminopropionitrile is formed by reacting α-hydroxypropionitrile with liquid ammonia to form α-aminopropionitrile and recovering said aminonitrile and reacting it with an anhydride of a loweralkanoic acid of from 2 to 4 carbon atoms.

4. The process which comprises reacting 3,4-dialkoxybenzene wherein the alkoxy groups have from 1 to 4 carbon atoms with formaldehyde in the presence of a base in an inert solvent and then with a diloweralkylamine wherein the lower alkyl groups have from 1 to 4 carbon atoms under acidic conditions in an inert solvent to produce a 3,4-dialkoxy-N,N-diloweralkylbenzylamine and reacting said benzylamine compound with an N-loweralkanoylaminopropionitrile wherein the lower alkanoyl group has from 2 to 4 carbon atoms in the presence of a basic enolyzing catalyst in an inert solvent at from 50–150° C. to form racemic α-methyl-α-loweralkanoylamino-β-(3,4-dialkoxy)propionitrile.

5. The process which comprises reacting veratrole with formaldehyde under basic conditions in an inert solvent and then with dimethylamine under acidic conditions in an inert solvent to produce N,N-dimethyl-3,4-dimethoxybenzylamine and reacting said benzylamine with α-acetylaminopropionitrile in the presence of a basic enoylzing catalyst in an inert solvent at from 50–100° C. to produce racemic α - methyl - α - acetylamino-β-(3,4-dimethoxyphenyl) propionitrile.

6. The process which comprises reacting catechol with formaldehyde under basic conditions in an inert solvent and then with a dilowalkylamine under acidic conditions wherein the lower alkyl groups have from 1 to 4 carbon atoms, in an inert solvent, to produce 3,4-dihydroxy-N,N-di-lower alkylbenzylamine and reacting said benzylamine with α-acylaminopropionitrile in the presence of a basic enolyzing catalyst and an inert solvent at 50 to 150° C., to produce racemic α-methyl-α-acylamino-β-(3,4-dihydroxyphenyl)propionitrile wherein the acyl group has from 2 to 4 carbon atoms.

7. The process which comprises reacting catechol with formaldehyde under basic conditions in an inert solvent and then with dimethylamine under acidic conditions in an inert solvent to produce N,N-dimethyl-3,4-dihydroxybenzylamine and reacting said benzylamine compound with α-acetylaminopropionitrile in the presence of a basic enolyzing catalyst and an inert solvent at 50–150° C. to produce racemic α-methyl-α-acetylamino-β-(3,4-dihydroxyphenyl)propionitrile.

8. The process which comprises reacting an o-lower alkoxy phenol wherein the lower alkoxy group has from 1 to 4 carbon atoms in an inert solvent with formaldehyde and then with a diloweralkylamine wherein the lower alkyl groups have from 1 to 4 carbon atoms to produce an N,N-dialkyl-4-hydroxy-3-lower alkoxybenzylamine and reacting said benzylamine with an α-alkanoylaminopropionitrile in the presence of a basic enoylzing catalyst and an inert solvent at 50 to 150° C. to produce racemic α-methyl-α-alkanoylamino-β-(4-hydroxy-3-loweralkoxyphenyl)propionitrile wherein the alkanoyl group has from 2 to 4 carbon atoms.

9. The process which comprises reacting guaiacol in basic solution in an inert solvent with formaldehyde and then with dimethylamine in acid solution in an inert solvent to produce N,N-dimethyl-3-methoxy-4-hydroxybenzylamine and reacting said benzylamine with α-acetylaminopropionitrile in the presence of a basic enolyzing catalyst and an inert solvent at 50 to 150° C. to produce racemic α-acetylamino-α-methyl-β-(3-methoxy-4-hydroxyphenyl)propionitrile.

References Cited

UNITED STATES PATENTS

| | | | |
|---|---|---|---|
| 1,503,631 | 8/1924 | Bradner et al. | 260—570.9 X |
| 2,553,441 | 5/1951 | Chenicek | 260—570.9 X |
| 3,274,253 | 9/1966 | Markiewitz | 260—570.9 X |

OTHER REFERENCES

Degering: An Outline of Organic Nitrogen Compounds, 1945, p. 303.
Adams: Organic Reactions, volume I, p. 311, 1954.
Bliche et al.: Journal of Organic Chemistry, volume 24, number 8, pp. 1061–1069.

CHARLES B. PARKER, Primary Examiner

S. T. LAWRENCE III, Assistant Examiner

U.S. Cl. X.R.

260—340.5, 465.4, 465.5, 519, 559, 570.9, 999

UNITED STATES PATENT OFFICE
CERTIFICATE OF CORRECTION

Patent No. 3,496,172　　　　　　　　Dated February 17, 1970

Inventor(s) David F. Hinkley

It is certified that error appears in the above-identified patent and that said Letters Patent are hereby corrected as shown below:

Column 1, line 61, ...-actamido-... should read "-acetamido-".

Column 3, line 48, ...automatic... should read "aromatic".

Column 3, line 63, following the first chemical compound which ends with the word ...propionitrile,... insert the compound "α-methyl-α-acetylamino-β-(3-methoxy-4-hydroxyphenyl)propionitrile,".

Column 3, line 69, ...-(β-4-... should read "-β-(4-".

Column 6, line 46, ...N,N-diolower... should read "N,N-dilower".

Column 6, line 58, ...enoylzing... should read "enolyzing".

Column 7, line 14, ...enoylzing... should read "enolyzing".

Signed and sealed this 13th day of April 1971.

(SEAL)
Attest:

EDWARD M. FLETCHER, JR.
Attesting Officer

WILLIAM E. SCHUYLER, JR.
Commissioner of Patents